(12) United States Patent
Lu (10) Patent No.: US 10,133,043 B1
(45) Date of Patent: Nov. 20, 2018

(54) COMPACT TELEPHOTO LENS CAMERA SUITABLE FOR USE IN SMART PHONES AND SIMILAR DEVICES, AND METHODS OF USING SAME

(71) Applicant: Weimin Lu, Novi, MI (US)

(72) Inventor: Weimin Lu, Novi, MI (US)

(73) Assignee: Telelens LLC., Novi, MI (US)

( * ) Notice: Subject to any disclaimer, the term of this patent is extended or adjusted under 35 U.S.C. 154(b) by 0 days.

(21) Appl. No.: 16/016,006

(22) Filed: Jun. 22, 2018

Related U.S. Application Data (63) Continuation-in-part of application No. 15/903,680, filed on Feb. 23, 2018, which is a continuation-in-part of application No. 15/657,990, filed on Jul. 24, 2017, now Pat. No. 9,933,604.

(60) Provisional application No. 62/666,041, filed on May 2, 2018, provisional application No. 62/647,806, filed on Mar. 25, 2018, provisional application No. 62/459,570, filed on Feb. 15, 2017, provisional application No. 62/449,097, filed on Jan. 22, 2017, provisional application No. 62/383,587, filed on Sep. 5, 2016.

(51) Int. Cl.
*G02B 17/08* (2006.01)
*G02B 5/00* (2006.01)
*H04N 5/225* (2006.01)

(52) U.S. Cl.
CPC ......... *G02B 17/0824* (2013.01); *G02B 5/003* (2013.01); *G02B 17/08* (2013.01); *H04N 5/2254* (2013.01)

(58) Field of Classification Search
CPC .... G02B 17/08; G02B 17/0824; G02B 5/003; H04N 5/2254
USPC ........................................................ 359/718
See application file for complete search history.

(56) References Cited

U.S. PATENT DOCUMENTS

| | | | |
|---|---|---|---|
| 929,795 A | 8/1909 | Siedentopf | |
| 2,726,574 A | 12/1955 | Mandler | |
| 3,527,526 A * | 9/1970 | Silvertooth | G02B 17/004 359/859 |
| 3,711,184 A * | 1/1973 | Amon | G02B 17/0808 359/731 |
| 3,748,020 A * | 7/1973 | Fischer | G02B 17/06 359/723 |
| 4,344,676 A | 8/1982 | Shafer | |

(Continued)

*Primary Examiner* — William R Alexander
(74) *Attorney, Agent, or Firm* — Carrier Blackman & Associates, P.C.; Joseph P. Carrier; William D. Blackman (57) ABSTRACT

A compact, on-axis telephoto lens camera includes an arrangement of mirrors which receives incident light, and compresses and redirects the light, the arrangement having a primary mirror which receives the incident light, compresses and redirects the light toward a focal point of the primary mirror and has an opening defined at a central portion thereof, and a secondary mirror which receives light from the primary mirror and further redirects same. The camera also includes a cavity which extends into the camera from the opening of the primary mirror, aspheric lenses disposed at least partially within the cavity which receive the light from the multiple-mirror arrangement, and progressively expand and redirect the light received from the mirror arrangement, and an image sensor which receives the light from the aspheric lenses. The image sensor is disposed closely adjacent to the cavity such that a back focal length is substantially zero.

20 Claims, 6 Drawing Sheets

(56) References Cited

U.S. PATENT DOCUMENTS

| | | | |
|---|---|---|---|
| 4,411,499 A * | 10/1983 | Abel | G02B 17/0808 359/648 |
| 4,666,259 A | 5/1987 | Iizuka | |
| 4,714,307 A | 12/1987 | Palmer | |
| 4,759,761 A | 7/1988 | Portnoy | |
| 5,042,928 A | 8/1991 | Richards | |
| 5,452,126 A | 9/1995 | Johnson | |
| 5,734,496 A * | 3/1998 | Beach | G02B 17/082 359/365 |
| 5,930,055 A | 7/1999 | Eisenberg | |
| 5,940,222 A * | 8/1999 | Sinclair | G02B 15/16 359/676 |
| 6,038,068 A * | 3/2000 | Takeshi | G02B 17/08 359/364 |
| 6,449,103 B1 * | 9/2002 | Charles | G02B 13/06 359/366 |
| 7,082,001 B2 * | 7/2006 | Vizgaitis | G02B 17/0694 359/729 |
| 7,180,659 B2 * | 2/2007 | Doittau | G02B 17/0652 359/364 |
| 7,236,297 B1 * | 6/2007 | Ackermann | G02B 17/0808 359/364 |
| 7,365,920 B2 | 4/2008 | Noda | |
| 7,826,151 B2 | 11/2010 | Tsai | |
| 7,843,650 B1 | 11/2010 | Roberts | |
| 7,898,749 B2 * | 3/2011 | Ford | G02B 17/002 359/726 |
| 8,638,369 B2 | 1/2014 | Tsai | |
| 8,639,106 B1 | 1/2014 | Gleason et al. | |
| 8,965,193 B1 | 2/2015 | Svec et al. | |
| 9,223,118 B2 | 12/2015 | Mercado | |
| 9,316,810 B2 | 4/2016 | Mercado | |
| 9,405,118 B1 | 8/2016 | Lu | |
| 9,557,627 B2 | 1/2017 | Mercado | |
| 9,817,213 B2 | 11/2017 | Mercado | |
| 9,874,721 B2 | 1/2018 | Mercado | |
| 2005/0180026 A1 * | 8/2005 | Pohle | G02B 7/1821 359/726 |
| 2006/0245046 A1 * | 11/2006 | Bergeron | G02B 7/181 359/366 |
| 2007/0177261 A1 * | 8/2007 | Murdock | G02B 17/0808 359/399 |
| 2007/0251568 A1 * | 11/2007 | Maeda | G02B 19/0042 136/246 |
| 2009/0082629 A1 * | 3/2009 | Dotan | A61B 1/00096 600/160 |
| 2010/0177315 A1 * | 7/2010 | Sudo | G01S 3/782 356/400 |
| 2012/0050890 A1 | 3/2012 | Kadkly | |
| 2012/0224386 A1 | 9/2012 | DeWitt | |
| 2013/0329283 A1 | 12/2013 | Nakano et al. | |
| 2015/0116569 A1 | 4/2015 | Mercado | |
| 2015/0177496 A1 * | 6/2015 | Marks | G02B 13/0065 348/335 |

* cited by examiner

COMPACT TELEPHOTO LENS CAMERA SUITABLE FOR USE IN SMART PHONES AND SIMILAR DEVICES, AND METHODS OF USING SAME

CROSS REFERENCE TO RELATED APPLICATIONS

The present application claims priority from U.S. Provisional Patent Application Nos. 62/647,806, filed 25 Mar. 2018, and 62/666,041, filed 3 May 2018. Additionally, the present application is a continuation-in-part of co-pending application Ser. No. 15/903,680, filed 23 Feb. 2018, which is a continuation-in-part of application Ser. No. 15/657,990, filed 24 Jul. 2017 (now U.S. Pat. No. 9,933,604 B2), which claims priority from U.S. Provisional Patent Application Nos. 62/383,587 filed Sep. 5, 2016, 62/449,097 filed Jan. 22, 2017, and 62/459,570 filed Feb. 15, 2017. The entire disclosure of each of the discussed prior applications is incorporated herein by reference.

BACKGROUND OF THE INVENTION

Field of the Invention

The present invention relates to compact, adjustable, on-axis, telephoto lens camera, which may have a cylindrical disc shape, with magnification power up to at least 6×, high image quality and total thickness less than ½ of its overall diameter, and which is particularly suited for being built into compact mobile devices such as smart phones and the like. More particularly, the present invention relates to such a telephoto lens camera which includes an on-axis, multiple mirror structure for collecting and magnifying incident light rays, and with a wide opening, deep cavity at a center of the mirror structure within and/or near which multiple aspheric corrective lenses are disposed for increasing image size and improving image quality toward a large image sensor such that back focal length is essentially eliminated.

Description of the Background Art

For high magnification power, currently all catadioptric telephoto lenses are built for use with single-lens reflex cameras (SLRs) or as add-on devices for use with compact mobile devices such as smart phones, due in part at least because the conventional catadioptric telephoto lenses are all designed with certain back focal length for cameras. The total length of a digital camera is a combination of total tracking length of lens(es) plus back focal length plus thickness of an image sensor. Such a length is far too large to be fitted inside of mobile phones and the like, which have an ever reducing thickness. For thin cameras, currently multiple lens systems used in mobile phones have achieved thin structure. However, the currently known thin cameras lack high magnification power.

Following is a discussion of some known thin camera lens systems and technologically related systems. U.S. Pat. No. 9,874,721B2 by Romeo L. Mercado, issued on Jan. 23, 2018, U.S. Pat. No. 9,817,213B2 by Romeo L. Mercado, issued on Nov. 14, 2017, and U.S. Pat. No. 9,223,118B2 by Romeo L. Mercado on Dec. 29, 2015 disclose optical imaging lens assemblies which use multiple, e.g., four to six, transparent lenses with a large aperture to achieve higher resolutions for cameras used in thin mobile devices such as smart phones with large image sensors. The disclosed lens assemblies do not involve use of mirror(s) for magnification. Similar optical imaging lens assemblies which do not involve use of mirrors for magnification are disclosed in U.S. Pat. No. 7,826,151B2 by Tsung-Han Tsai, issued on Nov. 2, 2010 and U.S. Pat. No. 7,365,920B2 by Sayuri Nodua, issued on Apr. 29, 2008. Tsai's system uses 5 lenses to make an image size larger than its aperture to achieve higher resolutions, while Nodua's system uses 4 lenses to make an image size larger than its aperture to achieve higher resolution.

U.S. Pat. No. 9,557,627B2 by Romeo L. Mercado issued on Jan. 31, 2017 discloses a folded camera lens system which uses a prism to bend incident light rays 90° and additional lenses to form a Galilean type telephoto lens. Its physical axis is bent to 90° and hence, it is not an on-axis telephoto lens, and its image sensor size is limited to the thickness of a mobile device such as a smart phone in which it is disposed. Similarly, U.S. Pat. No. 9,316,810B2 by Romeo L. Mercado, issued on Apr. 19, 2016 discloses a folded camera lens system which uses a mirror to bend incident light rays 90° and additional lenses to form a Galilean type telephoto lens. Again, its physical axis is bent to 90° and hence, it is not an on-axis telephoto lens, and its image sensor size is limited to the thickness of a mobile device.

U.S. Pat. No. 8,639,106B1 by Jeffrey Gleason, issued on Jan. 28, 2014 discloses a camera system having a mechanical structure with magnets to attach removable lens assembly and to ensure the optical axis alignment. The removable lens assembly is not a built-in component and protrudes out beyond the total thickness of the mobile devices, such as smart phones, with which it is used.

U.S. Pat. No. 8,638,369B2 by Richard Tsai, issued on Jan. 28, 2014 discloses a back panel for a portable electronic device with different camera lens options. It uses a mechanical means to add a reconfigurable back panel for changing a lens assembly, and mainly pertains to the interconnection between the main front panel and the attached back panel in physical and electrical aspects.

U.S. Pat. No. 7,843,650B1 by William Roberts, issued on Nov. 30, 2010 discloses a typical 2-piece Cassegrain mirror lens in one monolithic construction. However, it does not have a cavity that could enclose additional lenses, and it cannot have any built-in light shield to block undesired light rays as it does not have any telescopic application.

U.S. Pat. No. 4,759,761 by Vladimir Portnoy, issued on Jul. 26, 1988 discloses a small Cassegrain type monolithic mirror lens. Its external back focal length is longer than its total optical track length or thickness of the lens, it does not use any shields for block unwanted light rays, and has no cavity for any additional lenses.

U.S. Pat. No. 4,714,307 by John Palmer, issued on Dec. 22, 1987 discloses a typical Cassegrain type mirror lens with additional lenses in front of the secondary mirror and multiple lenses after the mirrors to reduce chromatic aberration and is designed as an afocal telescope, whereby there is no concern for the length of the telescope. The diameter of the secondary mirror is larger than the inner diameter of the primary mirror.

U.S. Pat. No. 4,666,259 by Yutaka Iizuka, issued on May 19, 1987 discloses a group of negative lenses inside typical Cassegrain type mirror lens to reduce the total optical track length of the lens system, and is designed for SLRs and has a significant external back focal length. Its primary mirror is not parabolic, which is an important factor in reducing thickness, whereby the total optical track length of its system must be more than ¼ of the size—diameter of the system's aperture. It has longer external back focal length to reach the image sensor and a diameter of its secondary mirror has similar size as the inner diameter of the primary mirror. It does not and cannot have wide inner diameter of the primary mirror because it does not have non-reflective disc shield around the secondary mirror to block unwanted incident light rays and, therefore, it cannot expand image size within its cavity. It could not increase an image size without further increasing its external back focal length, and it does not address a ghost image problem caused by the center area of the secondary mirror.

U.S. Pat. No. 2,726,574 by W. Mandler, issued on Dec. 13, 1955 discloses a typical 2-piece Cassegrain mirror lens with extra correction lenses before and after. It has external back focal length.

Thus, while there are known telephoto lenses are built for use with single-lens reflex cameras (SLRs) or as an add-on device for use with compact mobile devices such as smart phones, as well as known thin camera lens systems such as Cassegrain type monolithic mirror lens systems and optical imaging lens assemblies including various numbers of transparent lenses, and folded camera lens systems, there is no known compact telephoto lens camera which can achieve magnification power up to at least 6× with high image quality, and which may be disposed within a very thin device such as a smart phone. Hence, there is a need for such a telephoto lens camera can be provided in very compact sizes, which is structurally non-complicated and can be economically manufactured.

SUMMARY OF THE INVENTION

It is an aspect and object of the present invention to provide such a telephoto lens camera which satisfies the discussed need.

According to a first aspect of the present invention there is provided a compact, on-axis telephoto lens camera which comprises: an on-axis multiple-mirror arrangement which receives incident light entering the camera, compresses and redirects the received incident light, the multiple-mirror arrangement including a primary mirror which receives the incident light entering the camera, compresses and redirects the received incident light toward a focal point of the primary mirror and has an opening defined at a central portion thereof, and a secondary mirror which receives light that has been compressed and redirected by the primary mirror and further redirects the light; a cavity which extends from the opening at the central portion of the primary mirror towards the secondary mirror in a progressively reduced size; a plurality of aspheric lenses disposed at least partially within the cavity which receive the compressed and redirected light from the multiple-mirror arrangement, and progressively expand and redirect the light received from the multiple-mirror arrangement; and an image sensor which receives the expanded and redirected light from the aspheric lenses, wherein the image sensor is disposed closely adjacent to the cavity such that a back focal length, a physical distance between a last lens surface and the image sensor, is substantially zero.

The compact, on-axis telephoto lens camera according to the first aspect of the present invention is very advantageous over conventional telephoto lens systems and conventional compact cameras known at the time of the present invention because the camera according to the first aspect of the invention can provide a magnification power of at least 6×, and may include a relatively large size image sensor, e.g., a 1/2.3" sensor or even a ½" sensor, for high quality images, yet with an overall longitudinal thickness of as little as about 4-5 mm so that the camera may be conveniently fitted within compact—thin mobile devices such as smart phones.

According to a second aspect of the present invention, in the camera according to the first aspect a focal point of the primary mirror is offset from a central longitudinal axis of the camera, and the on-axis multiple-mirror arrangement additionally includes at least one mid-mirror disposed between the primary and secondary mirrors which directs light from the primary mirror to the secondary mirror.

The compact, on-axis telephoto lens camera according to the second aspect of the present invention is further advantageous over the conventional telephoto lens systems and conventional compact cameras known at the time of the present invention because the mirror arrangement according to the second aspect may have a reduced longitudinal thickness as compared to a mirror arrangement in which the focal point of the primary mirror is disposed on the central longitudinal axis of the camera and light rays are directly directed from the primary mirror to the secondary mirror.

According to a third aspect of the present invention, in the on-axis multiple-mirror arrangement according to the first aspect a diameter of the opening in the central portion of the primary mirror is at least 1.5 times as large as an outer diameter of the secondary mirror, and the plurality of aspheric lenses have different sizes and are arranged relative to each other according to progressively increasing size such that a largest one of the aspheric lenses is disposed closest to the image sensor.

The compact, on-axis telephoto lens camera according to the third aspect of the present invention is further advantageous over the conventional telephoto lens systems and conventional compact cameras known at the time of the present invention because the aspheric lenses with progressively increasing size form a diverging path to expand the size of images captured by the image sensor, and the relatively large size of the diameter of the opening in the central portion of the primary mirror relative to the outer diameter of the secondary mirror permits the image sensor to have a relatively large size for improved image quality.

According to a fourth aspect of the present invention, the camera further comprises an adjustment mechanism which can adjust size of a distance between the image sensor and one of the aspheric lenses which is closest to the image sensor.

The compact, on-axis telephoto lens camera according to the fourth aspect of the present invention is further advantageous over the conventional telephoto lens systems and conventional compact cameras known at the time of the present invention because the adjustment mechanism permits fine adjustment of a position of a focal point—pattern of the one of the aspheric lenses which is closest to the image sensor for improved image quality.

According to a fifth aspect of the present invention, the camera further comprises an monolithic member formed of a optical material having a positive refractive index and the mirror arrangement is formed on the monolithic member.

The compact, on-axis telephoto lens camera according to the fifth aspect of the present invention is further advantageous over the conventional telephoto lens systems and conventional compact cameras known at the time of the present invention because formation of the mirror arrangement on the monolithic member provides additional convenience in manufacturing and handling of the telephoto lens camera.

For a more complete understanding of the present invention, the reader is referred to the following detailed description section, which should be read in conjunction with the accompanying drawings showing present embodiments of the invention. Throughout the following detailed description and in the drawings, like numbers refer to like parts.

Intent of Disclosure

Although the following disclosure offered for public dissemination is detailed to ensure adequacy and aid in understanding of the invention, this is not intended to prejudice that purpose of a patent which is to cover each new inventive concept therein no matter how it may later be disguised by variations in form or additions of further improvements. The claims at the end hereof are the chief aid toward this purpose, as it is these that meet the requirement of pointing out the improvements, combinations and methods in which the inventive concepts are found.

There have been chosen specific exemplary embodiments of a compact, on-axis telephoto lens camera according to the present invention, as well as some alternative structures and modifications thereto. The exemplary embodiments chosen for the purposes of illustration and description of the structure and method of the invention are shown in the accompanying drawings forming a part of the specification.

DETAILED DESCRIPTION OF THE PRESENT ILLUSTRATIVE EMBODIMENTS

A number of selected illustrative embodiments of the invention will now be described in detail, with reference to the drawings. It should be understood that only structures considered necessary for clarifying the present invention are described herein. Other conventional structures, and those of ancillary and auxiliary components of the camera, are known and understood by those skilled in the art. These illustrative embodiments depict compact, on-axis telephoto lens cameras according to the present invention and various components of such systems. Like components in various embodiments will be described with like or similar reference numbers.

Figure 1:
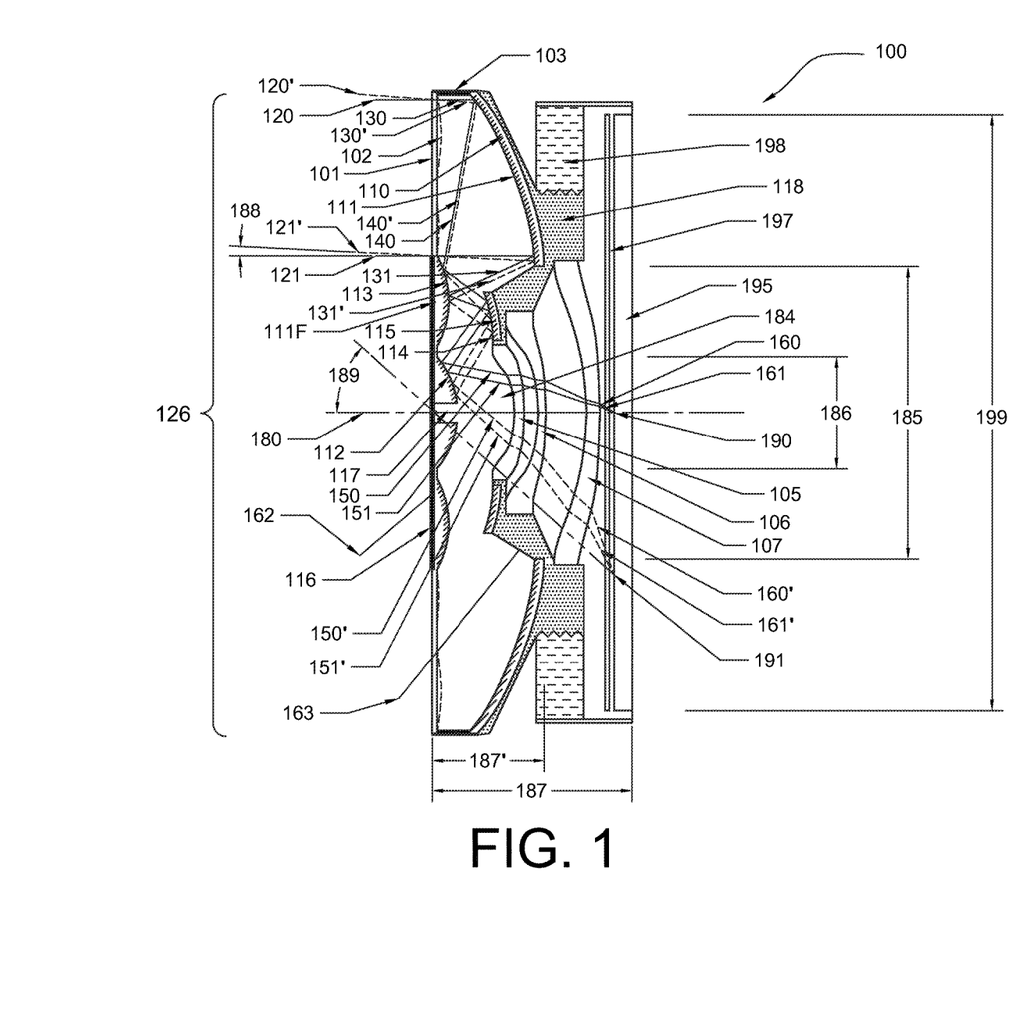
FIG. 1 is a side, cross sectional view of a compact, on-axis telephoto lens camera according to a first illustrative embodiment of the present invention.

Referring now to the FIG. 1 there is shown in side cross sectional view a very thin-compact, disc shape, on-axis, telephoto lens camera according to a first illustrative embodiment of the present invention 100. A physical as well as optical axis 180 is the main and only axis extending in a longitudinal direction of the camera 100. As depicted, the camera 100 includes multiple discrete components combined together in specific positional relationships within a housing which blocks entry of incident light except through an aperture 126. Generally, the camera 100 includes a first lens 101 at one longitudinal side thereof which defines the aperture 126 for admitting incident light, an on-axis arrangement of multiple mirrors 111, 112, 113, 114 which receive, compress and redirect the incident light received through the first lens 101, plural aspheric lenses 105, 106 disposed within a cavity 184 which extends into the camera from a central portion of the mirror 111 towards the mirror 112 and which function to expand the light from the mirror arrangement and possibly correct—improve quality of an image created by the light, another aspheric lens 107 which is disposed outside of the cavity 184 and which further expands the light from the lenses 105, 106 and possibly corrects—improves quality of an image created by the light, a mechanism 198 such as a step motor for adjusting the position of the lens 107 along the central, longitudinal axis 180 of the camera, and an image sensor 195 which receives the light from the lens 107.

Based on several aspects of the camera, including the disposition of the image sensor very closely adjacent to the cavity 184 and to the lenses 105-107 such that a back focal length, a physical distance between the lens 107 and the image sensor 195, is essentially eliminated, and a relatively large size-diameter of the image sensor 195 relative to a longitudinal thickness of the camera, the camera 100 may be conveniently disposed within compact mobile devices such as smart phones and the like.

The first lens 101 may be a thin transparent member formed of common optical materials, like acrylic or glass with a planar surface in doughnut shape on an outer—object side thereof, which receives incident light rays that enter the camera 100. The other—inner side of the first lens 101 may also have a planar surface or may have an aspheric surface, as indicated by the broken line 102, for aberration correction. Beside providing a protective function for the camera, the first lens 101 also transmits incident light rays toward a first or primary mirror 111 of the mirror arrangement. A circular center portion of the other-inner side of the lens 101 may be formed with or have connected thereto a second or secondary mirror 112 and a third, mid curved mirror 113 of the mirror arrangement, both having reflective surfaces facing toward the first mirror 111, and both having a generally doughnut shape. For example, the first lens 101 may be molded to include projecting portions which correspond to the second and third mirrors 112, 113 and a totally reflective material like aluminum may be coated onto the projecting portions to form the mirrors. As another example, the second and third mirrors 112, 113 may be formed separately from the first lens 101 and bonded to the inner side of the lens 101. The outer-object side of the first lens 101 may also have a thin non-reflective, disc-shaped light barrier 116 provided thereon. For example, the light barrier may be formed using a black, light-blocking material such as a carbon material coated onto the outer-object side of the first lens 101 or may be formed as light blocking, disc-shaped member which is bonded to the outer-object side of the first lens 101.

The mirror arrangement includes the mirrors 111-114, of which the first or primary mirror 111 is concave, faces toward the first lens 101 and is generally doughnut shaped with the cavity 184 at the central portion thereof, the secondary mirror 112 and the third mid mirror 113 which are convex, face toward the first mirror 111 and are generally doughnut shaped, and the fourth mirror 114 is another mid curved mirror which is concave, faces toward the second and third mirrors, and also has a generally doughnut shape. The first mirror 111 and fourth mirror 114 may include respective substrates 110, 115 that have outer surfaces coated by a totally reflective material like aluminum and may be fixed in position relative to each other by a mount 118. The mid curved mirror 114 is placed on the same side of the camera as the first mirror 111. The function of the third and fourth mid curved mirrors 113, 114 is to bridge in reflection of light rays from the first mirror 111 to the second mirror 112, particularly where a focal point or pattern 111F of the first mirror is not on the camera's central axis 180, as in the depicted first embodiment, which is discussed further herein. A ring spacer 103 may be disposed between the first mirror 111 and the first lens 101, which may fix the position of these components relative to each other. The ring spacer 103 may also have light-blocking, and non-reflective characteristics to prevent incident light rays from entering the camera therethrough and to prevent scattering of light rays within the camera 100. For example, the ring spacer 103 may be molded or formed from any appropriate light-blocking, non-reflective material or have a light-blocking, non-reflective material such as a carbon material coated thereon.

In the mirror arrangement of the camera the first or primary mirror 111 receives incident light rays that enter the camera 100 through the aperture 126 defined by the first lens 101, reflects and converges the light rays towards the second or secondary mirror 112 via the third and fourth mid curved mirrors 113 and 114. Again, the first mirror 111 is a concave mirror in a generally doughnut shape, and may be formed as a parabolic mirror with the focal point—pattern 111F offset from the central axis 180, and with its outside diameter which is essentially the same as that of the aperture 126 and a relatively wide inner diameter 185 at the central opening of the first mirror. As depicted, the inner diameter 185 may be about one half the size as the outer diameter of the aperture 126 and more than 1.5 times the size as the outer diameter of the second mirror 112. The parabolic shape of the primary mirror 111 is important for achieving a very small thickness for the camera 100. Again, the cavity 184 extends into the camera from the inner diameter 185 of the first mirror 111 towards the secondary mirror 112 in a progressively reduced size, e.g., such as an isosceles trapezoidal shape, and the aspheric lenses 105, 106 are disposed in the recess. The progressively reduced size and isosceles trapezoidal shape of the cavity, as well as the relatively large size of the diameter of the central opening 185 in the primary mirror 111 as compared to the outer diameter of the secondary mirror 112, are important because these help to ensure that the light rays passing from the lenses 105, 106 can be diverged progressively and widely enough relative to the image sensor 195 which has a desirably large outer diameter 199 for improved image quality. As depicted, the outer diameter of the aperture 126, which is essentially the same as the outer diameter of the first mirror 111, may also be slightly larger than the outer diameter 199 of the image sensor 195.

A very important aspect of telephoto lens camera 100 according to the first embodiment of the present invention is the fact that the camera is very compact—thin in the longitudinal direction thereof, i.e., along axis 180 in this embodiment. A crucial dimension for total thickness 187 of the camera 100 is a thickness 187' of the arrangement of the mirrors 111-114. A small mirror arrangement thickness 187' is important to ensure a smaller the total thickness 187 of the camera 100. Current mobile devices such as smart phones are becoming thinner and thinner, so that if the camera 100 is to fit within such a device the total thickness 187 of the camera will need to be about 4-5 mm, or less. One aspect of the mirror arrangement which helps to achieve such result is that the focal point-pattern 111F of the first mirror 111 is made to be away from the central axis 180 of the camera. Particularly, in an end view (not shown) from the aperture 126 of the camera 100 extending perpendicular to the side view of FIG. 1, the focal point-pattern 111F of the primary mirror 111 will appear as a circular line extending coaxially around the main longitudinal axis 180. However, with the focal point-pattern 111F positioned away from the central axis 180 and the relatively close proximity of the second mirror 112 to the primary mirror 111, the reflected light rays from the first mirror 111 could not directly reach the second mirror 112, whereby the third and fourth mid curved mirrors 113 and 114 are provided between the first and second mirrors 111, 112 whereby light rays from the first mirror 111 are received by the third mirror 113, redirected by the third mirror to the fourth mirror 114, and redirected by the fourth mirror 114 to the second mirror 112.

In the depicted embodiment the second or secondary mirror 112 is a convex mirror, and specifically a hyperbolic mirror with an outer diameter 186, a base of which may be formed integrally with the first lens 101 and coated with totally reflective material, like aluminum. The second mirror 112 reflects light rays back towards the direction where the image sensor 195 is located. It will be noted that the depiction of the first-fourth mirrors 111-114 in FIG. 1 is not to scale and may not exactly represent actual curvatures of the mirrors in a working example of the present invention, but is intended to illustrate the reflection of light rays by the mirrors in an easily understandable manner. In a given physical space of a camera, there may be many different arrangements of mirrors with various curvatures to achieve a given reflection and image quality. Again, the hyperbolic nature of the second mirror 112 is helpful to reduce the longitudinal thickness of the camera 100.

In the center of the second mirror 112 there is formed a small hole or recess 117, and based on the position of the hole 117 and the arrangement of the mirrors, incident light rays cannot reach into the hole 117. This is desirable because if there was no such little hole 117 and the reflective surface of the second mirror 112 covered the area of the hole 117, such reflective surface at the area of the hole 117 would be very parallel to the image sensor 195. Correspondingly, any image in the center of the image sensor 195 could be reflected back by such reflective surface to form a so-called "ghost image", similar to an image that occurs when a person looking at a small convex mirror that reflects his/her face at a center of the mirror. Any such ghost image is undesirable because it may reduce the quality of the image captured by the image sensor 195. Apart from making the small hole 117, there are other ways to eliminate formation of ghost images by the camera. For example, another way is to make or cover the little center area of the second mirror 112 with non-reflective material, but this can be somewhat difficult to effect. However, forming the little hole 117 is one easy way to prevent formation of ghost images.

The thin non-reflective disc shield 116 is provided at the center of the outer-object side of the first lens 101 provided therewith. An outer diameter of the shield 116 is approximately the same size as the inner diameter 185 of the first mirror 111. The shield 116 functions to block unwanted incident light rays such as the light ray 162 from entering the camera, the aspheric lenses 105-107 and the image sensor 195 because such unwanted light rays would adversely affect the quality of images captured by the camera. The shield 116 also covers back sides of the second mirror 112 as well as the mid mirror 113 to prevent reflection of light from the mirror back sides. If the outer diameter of the shield was bigger than the inner diameter 185 of the first mirror 111, it would reduce the amount of the incident light rays entering onto the first mirror 111 and hence reduce image brightness and/or quality. If it was smaller than the inner diameter 185, it would be insufficient for its intended functions.

Each of the aspheric lenses 105, 106 disposed inside the cavity 184 and the aspheric lens 107 disposed outside the cavity 184 may have one or both of the opposite sides thereof formed aspheric to expand image size and/or adjust image quality. The aspheric lenses 105-107 may also have various complicated shapes, including one or more surfaces thereof having both convex and concave portions, etc. As a general matter, the camera 100 requires at least one such aspheric lens, and the more aspheric lenses there are, the better the quality of image that may be captured by the camera 100. Of course, in forming the camera to be as thin as possible and keeping cost to a reasonable level, there may be a practical limit to the number of the aspheric lenses which can be included with the camera. The outer diameters of the multiple aspheric lenses 105, 106, 107 progressively increase based on their proximity to the image sensor 195 in order to progressively enlarge the image size of the light rays passing through the lenses toward the image sensor. Again, it should be noted that the depicted shapes of aspheric lenses 105-107 are not to scale and do not exactly represent the actual curvatures of the lenses, but are intended to illustrate the path of light rays for ease of understanding. In a given physical space of a camera, there may be used many different combinations of different lenses to achieve a given image size and image quality. Because the aspheric lenses 105-107 progressively increase in size toward the image sensor 195 and are able to expand the image size of the light rays beyond and larger than the diameter 185 of the central opening of the first mirror 111, this permits the image sensor 195 having a larger outer diameter than the diameter 185 of the central opening to be effectively used in the camera 100 for achieving a high image quality.

It will be noted that the size of outer diameter of the image sensor 195 is not a restriction on the thickness of a device in which the camera 100 is disposed, such as a smart phone or other mobile device, because the diameter does not extend in the thickness direction. Hence, the outer diameter of the image sensor 195 may, for example, be the same, smaller or larger than the inner diameter 185 of the first mirror 111, or even bigger than the aperture 126 of the camera 100. Again, according to an important aspect of the present invention, because the image sensor 195 is disposed closely adjacent to the last aspheric lens 107 and the focal point 190 of the lens 107 is directly on the image sensor, there is minimal or no back focal length for the camera 100, which significantly contributes the reduction of the total thickness 187 of the camera 100. The aspheric lenses 105, 106, 107 may be molded by common optical materials with a positive refractive index such as acrylic or glass. Also, one or more of the aspheric lenses within the cavity 184 may be molded integrally with a substrate for the first mirror 111 and/or with a substrate for the fourth, mid mirror 114. Depicted at 197 is an optional infrared (IR) screen that may be included with the camera 100 to filter out IR light rays before they reach the image sensor 195.

A mount 118 as depicted in dotted area may be used to assemble all mirrors 111-114 and lenses 105-107 together into one fixed unit of the camera. The mount 118 may be formed or molded as a single piece or multiple pieces using a non-reflective black material. One portion of the mount 118 which extends into the opening at the central portion of the primary mirror 111 and forms a sidewall defining the cavity 184 may have a trapezoidal shape as depicted, and functions to shield or block unwanted incident light rays coming from other than the secondary mirror 112, such as the light ray 163, from reaching the lenses 105, 106, and 107. This is desirable because such unwanted light rays would detrimentally affect the quality of images captured by the camera. As depicted, the mount 118 may also be provided with a gear (indicated by a wavy line) which mechanically engages with a geared step motor or other appropriate device as generally indicated at 198. The step motor 198 is connected to the image sensor 195 and may selectively move the mount 118 with all mirrors and lenses a short distance toward or away from the image sensor 195 for fine adjustment, e.g., to increase image distance to the image sensor 195. Similar to the adjustment action of an SLR camera, when an object is near to the camera 100, it may be desirable to increase the image distance from the lens 107 to the image sensor 195 a little so that an image on the image sensor 195 is sharp. In the depicted arrangement the image sensor 195 is stationary, while the mount 118 with all mirrors and lenses is moves relative to the image sensor by the motor 198. Alternatively, the mount 118 may be stationary within the camera and the image sensor 195 may be operatively connected to the motor 198 so that the sensor may be moved relative to the other components.

A brief explanation of how lights rays enter, pass through and are captured as images by the camera 100, based on the simplified ray diagram in FIG. 1 is as follows in which only representative light rays are depicted and discussed. When parallel incident light rays 120 and 121 within the aperture 126, shine on the outer-object surface of the first lens 101, incident light ray 120 passes through the first lens 101 and becomes light ray 130. It is then reflected by the first or primary mirror 111 to become light ray 140 and converges to the second or secondary mirror 112 via the third and fourth curved mid mirrors 113 and 114. It then is reflected to become light ray 150 towards the aspheric lens 105 and is then sequentially refracted by the multiple aspheric lenses 105, 106, and 107 such that it is expanded and possibly corrected. It exits lens 107 to become light ray 160 and then passes through the optional IR screen 197 towards a focal point 190 of the lens 107 which corresponds with the location of the image sensor 195. Similarly, light ray 121 becomes 131, then 151, and finally 161.

In a common telephoto lens, an angle of view is typically about 5°, whereby not all of the incident light rays entering the camera are parallel to each other, and in FIG. 1 incident light rays 120' and 121' enter the camera 100 at an angle of approximately 2.5° to horizontal as depicted at reference number 188. When the light ray 120' shines on the outer-object surface of the first lens 101 within the aperture 126, the incident light ray 120' passing through the first lens 101 becomes light ray 130'. It is then reflected by the first mirror 111 to become light ray 140' and converges to the second mirror 112 via the third and fourth curved mid mirrors 113 and 114. It then is reflected to become light ray 150' towards the aspheric lens 105 and is then refracted to be expanded and possibly corrected by the multiple aspheric lenses 105, 106, and 107. It exits lens 107 to become light ray 160' and then goes through the IR screen 197 towards a focal point— pattern 191 of the lens 107, which also corresponds to where the image sensor 195 is located. As shown in FIG. 1, the light ray 120' which enters the lens 101 at an angle of approximately 2.5° is expanded by the aspheric lenses 105-107 such that the focal point 191 where the ray 160' hits the image sensor 195 is at a location which is at an angle of approximately 45° to the central axis 180 of the camera as indicated at 189. Similarly, the incident light ray 121' becomes 131', then 151', and finally 161'.

Within the camera the first mirror 111 and second mirror 112, together with the third and fourth curved mid mirrors 113 and 114, compress and redirect light rays in a manner that magnifies the image corresponding to the light rays. The magnification rate can also be understood by change of angle of view. Increasing angle of view on an object is like bringing the object closer. If a single lens reflex (SLR) camera had a same size of image sensor at a same focal distance with a same total optical track length, an angle of view would be about 90°, or 45° as depicted at the half of angle of view 189. Therefore, in the camera 100 according to the first embodiment of the present invention, a 5° designed angle of view is equivalent to 90° angle of view for a SLR camera. In general, for a telephoto lens camera according to the present invention having a magnification power of at least 6×, if a designed angle of view is between 3°-10°, this would be equivalent to an angle of view of 30°-150° for a SLR camera with similar overall physical size and image sensor size.

The following explanation of an example of the camera 100 according to the first embodiment is only for purposes of understanding of design variables to be addressed in relationships of components of the camera, and is not intended to limit the invention in any way. If the outer diameter of the image sensor 195 is ½", then a diagonal dimension 199 of the image sensor is 8 mm and its thickness is 1.5 mm. Setting the fixed aperture 126 at 10 mm in outer diameter, then the mirror arrangement thickness 187' becomes 1.25 mm. Setting the thickness of the aspheric lens 107 (or of multiple aspheric lenses) disposed outside of the cavity 184 beyond the mirror arrangement at 1.25 mm. Hence, the collective, total thickness of the camera, including the thicknesses of the image sensor, the mirror arrangement and the lens(es) outside of the cavity 184 is 4 mm. Adding in extra thickness of approximately 1 mm attributable to the adjustment of image distance, the overall dimensions of the camera 100 are 10 mm in outer diameter and 5 mm in total thickness. Setting the outer diameter 186 of the second mirror 112 at 1.5 mm, then the magnification power for the camera 100 is 6×.

Some considerations pertaining to dimensional relationships of the camera's components and possible modifications and improvements for the camera 100, include the following. The larger the aperture 126 for the incident light entering the camera, the more incident light rays get into the camera and the brighter the image is. However, increasing the size of the aperture would also increase the mirror arrangement thickness 187' and to any extent that the total thickness 187 of the camera 100 is limited, would correspondingly limit the size of the image sensor 195. On the other hand, if the outer diameter of the aperture 126 is made smaller, this would lower the brightness of the images captured by the camera, but permit an increase in the size of the image sensor 195. Therefore the aperture 126, which corresponds to the overall diameter of the first mirror 111, may be bigger or smaller than the diameter 199 of the image sensor 195. Depending on allowed total thickness of a camera for a current mobile device in which the camera is to be disposed, the total thickness of the camera may be designed between approximately 2-8 mm. In general, for a thin telephoto lens camera such as the camera 100 of the first embodiment, the overall diameter of the camera, which generally corresponds to the larger of either the outer diameter of the aperture 126 or the outer diameter of the image sensor 195, will be significantly bigger than the total longitudinal thickness of the camera. It is possible to use more mid mirrors than just the third and fourth mirrors 113, 114 in mirror arrangement of the depicted embodiment for transmitting light rays from the first mirror 111 to the second mirror 112, and by using more mid mirrors it is possible to increase the size of the outer diameter of the aperture 126 without increasing the mirror assembly thickness 187. However, adding additional mid mirrors will make the camera more complicated and expensive to manufacture.

It is reasonable to make the diameter 185 of the opening in the central portion of the first mirror 111 at least 1.5 times larger than the outer diameter 186 of the second mirror 112. Of course, making the mirror arrangement thickness 187' thinner permits the total thickness 187 of the camera 100 to be correspondingly reduced. If the aspheric lens 107 disposed outside of the cavity 184 is not needed, e.g., if the image sensor 195 has a relatively small outer diameter, the smaller image sensor 195 may also be placed inside the cavity to further reduce the total thickness 187 of the camera.

Generally, it is preferable that the inner diameter 185 of the opening in the central portion of the first or primary mirror 111 is at range between 1.5 times of the outer diameter 186 of the second or secondary mirror 112 and 0.75 times the outer diameter of the first or primary mirror 111 which, again, corresponds to the outer diameter 199 of the image sensor 195.

Because the telephoto lens camera 100 is also designed for higher magnification power, the diameter 186 of the second mirror 112 (secondary mirror) must be relatively small in comparison to the aperture 126 for incident light defined by the first lens 101. For example, to achieve an 8× magnification power, the outer diameter 186 of the second mirror 112 (secondary mirror) should be approximately ⅛ of the outer diameter of the aperture 126. Increasing the size of the outer diameter 186 of the second mirror 112 (secondary mirror) relative to the size of the outer diameter of the aperture 126 will reduce the magnification power of the telephoto camera 100. However, reducing the size of the outer diameter 186 of the second mirror 112 to a very small size could impose practical difficulties in design and manufacturing of the camera. Generally, if a camera according to the present invention is designed—constructed to have a magnification power in a range of 3×-12×, this would be very suitable for most mobile devices, such as smart phones, with which the camera may provided.

If the camera 100 is to include only one aspheric lens, such as the lens 105, then a secondary mirror 112 having a small size results a small size of image formed on the image sensor 195. Having multiple aspheric lenses such as the three depicted lenses 105, 106, 107, and more, desirably permits an image size to be enlarged towards the image sensor 195.

As mentioned above, some of aspheric lenses 105, 106 may include substrates which are combined or formed integrally with mirrors 114, 111 of the mirror arrangement so as to simplify manufacturing and assembly of the camera 100, e.g., a substrate of the aspheric lens 105 may be formed integrally with the mid mirror 114, etc., and substrates for the second and/or third mirrors 112, 113 may be formed integrally with the first lens 101. Also, the first lens 101 may include an aspheric surface 102 to help correct chromatic aberration.

All of such design relationships, modifications and improvement discussed in relation to the camera 100 can also be applied to other embodiments of a telephoto lens camera according to the present invention, which are discussed below.

Figure 2:
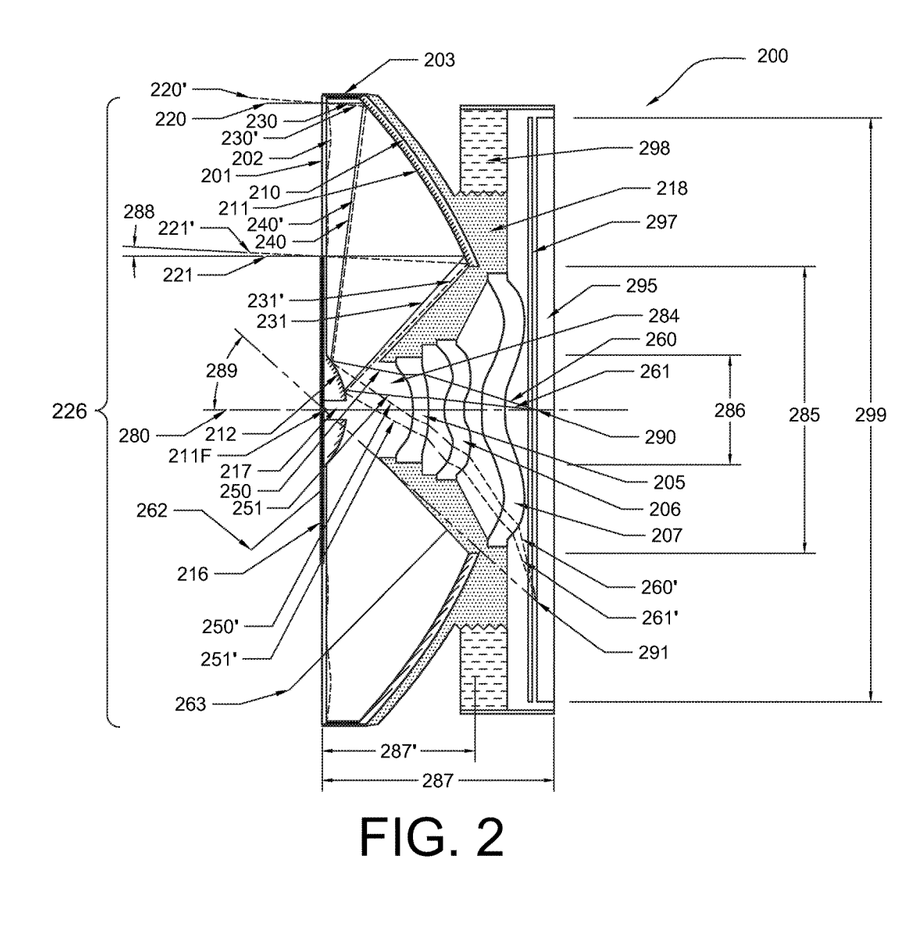
FIG. 2 is a side, cross sectional view of a compact, on-axis telephoto lens camera according to a second illustrative embodiment of the present invention.

Referring to FIG. 2 there is shown a side, cross sectional view of a compact, disc-shaped, on-axis telephoto lens camera 200 according to a second illustrative embodiment of the present invention. A physical as well as optical axis 280 of the camera 200 is the main and only axis extending in the horizontal direction of the camera. The camera 200 is structurally and functionally similar to the camera 100 in FIG. 1 except that it does not include third and fourth mid mirrors such as the mirrors 113, 114 in the camera 100, and the focal point 211F of the first or primary mirror 211 is on the main axis 280 rather than being offset therefrom such as the focal point 111F is offset from the main axis 180 in the camera 100. Correspondingly, the arrangement of mirrors 211, 212 in the camera 200 has a larger thickness in the longitudinal direction along the main axis 280 in comparison to the arrangement of mirrors 111-114 in the camera 100. Again, like parts of the camera 200 are designated by reference numbers similar to those of the camera 100 except that the numbers begin with "2" rather than "1". All details of the camera 200 will not be described, as many of the details correspond to the details of the camera 100 discussed above in relation to FIG. 1. Primarily, the differences will be described.

A first lens 201 of the camera 200 is a thin transparent cover in doughnut shape with a planar surface on an outer-object side, through which incident light rays enter the camera, and the other-inner side which may be a planar surface or an aspheric surface for aberration correction as indicated by broken line 202. Beside providing a protective function for the camera 200, the first lens 201 transmits incident light rays entering the camera 200 to the first or primary mirror 211. At a center portion of the inner side of the first lens 201 the second or secondary mirror 212 is disposed to as to face toward the first mirror 211, while at a center portion of the outer-object side of the first lens 201 there is provided a thin, light-blocking, non-reflective circular shield 216. The second mirror 212 may be formed similarly to the second mirror 112 of the camera 100 and the shield 216 may be formed similar to the shield 116 of camera 100. The first lens 201 may be molded by common optical materials with positive refractive index, like acrylic or glass, and mirror areas thereof may be formed by coating outer surface(s) thereof with a totally reflective material, such as aluminum.

The first mirror 211, which may be formed by coating a totally reflective material such as aluminum on a substrate 210, functions as a primary mirror that receives incident light rays entering the camera 200 through the first lens 201, and reflects and converges light rays directly towards the second mirror 212. The first mirror 211 is a concave mirror in doughnut shape, and is specifically depicted as a parabolic mirror with a focal point 211F on the camera's main axis 280. An outer diameter of the first mirror 211 is essentially the same as that of an aperture 226 defined by the first lens and a diameter 285 of an opening defined at a central portion of the first mirror 211 is relatively large, while a cavity 284 is defined that extends from the central opening of the first mirror 211 towards the second mirror 212, and aspheric lenses 205, 206 are disposed in the cavity 284. The second mirror 212 may be a convex mirror, and is specifically depicted as a hyperbolic mirror with a hole or recess 217 defined at a central portion thereof for the purpose of eliminating ghost images. The rest of the components of the camera 200, including aspheric lens 207, image sensor 295, IR screen 297, mount 218, step motor 298, ring spacer 203, shield 216, outer diameter 286 of the second mirror, outer diameter 299 of the image sensor, blockage of unwanted light rays such as rays 262, 263, etc., correspond to the like components of the camera 100 in FIG. 1 in structure and function and are not discussed in detail.

A brief explanation of how lights rays enter, pass through and are captured as images by the camera 200, based on the simplified ray diagram in FIG. 2, is as follows in which only representative light rays are depicted and discussed. When parallel incident light rays 220 and 221 shine on the outer-object surface of the first lens 201 within the aperture 226, incident light ray 220 passes through the first lens 201 and becomes light ray 230. It is then reflected by the first or primary mirror 211 to become light ray 240 and is directed directly to the second mirror 212. It then is reflected to become light ray 250 towards the aspheric lens 205 and is then sequentially refracted by the multiple aspheric lenses 205, 206, and 207 such that it is expanded and possibly corrected. It exits lens 207 to become light ray 260 and then passes through the optional IR screen 297 towards a focal point-pattern 290 of the lens 207 which corresponds with the location of the image sensor 295. Similarly, light ray 221 becomes 231, then 251, and finally 261.

In FIG. 2 incident light rays 220' and 221' enter the camera 200 at an angle of approximately 2.5° to horizontal as depicted at reference number 288. When the light ray 220' shines on the outer-object surface of the first lens 201 within the aperture 226, the incident light ray 220' passing through the first lens 201 becomes light ray 230'. It is then reflected by the first mirror 211 to become light ray 240' and is directed to the second mirror 212. It then is reflected to become light ray 250' towards the aspheric lens 205 and is then sequentially refracted to be expanded and possibly corrected by the multiple aspheric lenses 205, 206, and 207. It exits lens 207 to become light ray 260' and then goes through the IR screen 297 towards a focal point-pattern 291 of the lens 207, which also corresponds to where the image sensor 295 is located. As shown in FIG. 2, the light ray 220' which enters the lens 201 at an angle of approximately 2.5° to horizontal is expanded by the aspheric lenses 205-207 such that the focal point 291 where the ray 260' hits the image sensor 295 is at a location which is at an angle of approximately 45° to the central axis 280 of the camera as indicated at 289. Similarly, the incident light ray 221' becomes 231', then 251', and finally 261'.

The telephoto lens camera 200 according to the second embodiment achieves all of the same advantages as the camera 100 according to the first embodiment except that the longitudinal thickness 287' of the arrangement of mirrors 211, 212 is larger than the longitudinal thickness 187' of the arrangement of mirrors 111-114, again, because shifting of the focal point 111F of the first mirror 111 to be offset from the main axis 180 and addition of the third and fourth mid mirrors 113, 114 permits a reduction of the longitudinal thickness 187' of the mirror arrangement in the camera 100.

Figure 3:
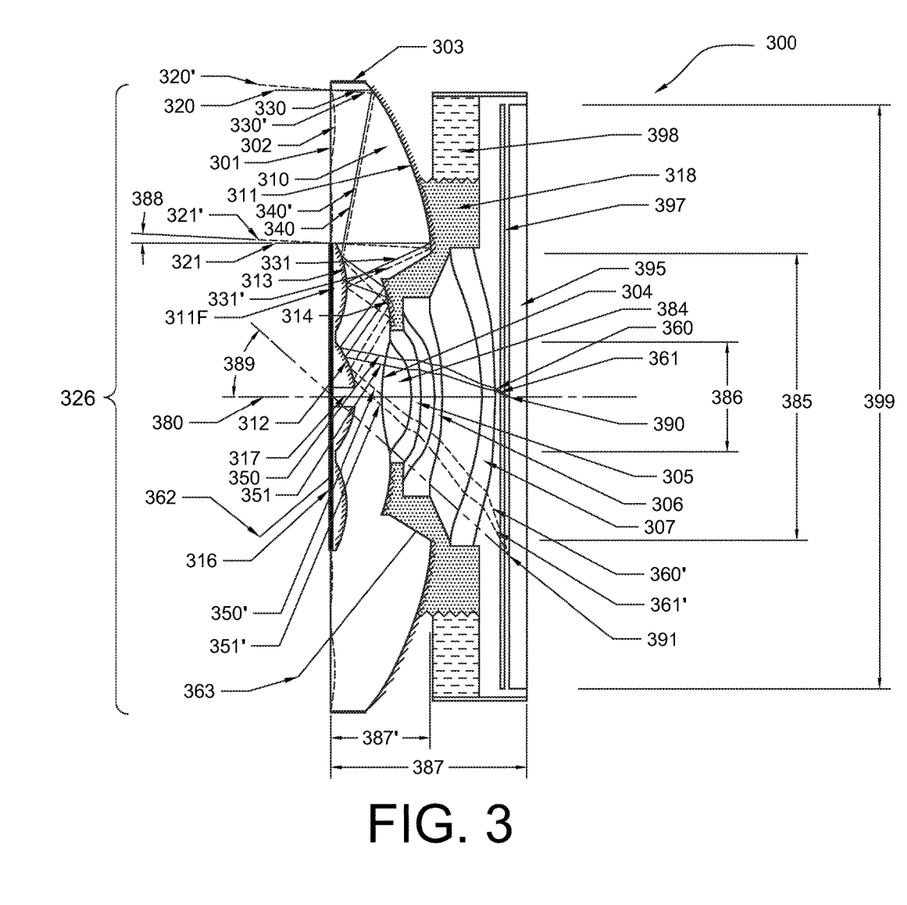
FIG. 3 is a side, cross sectional view of a compact, on-axis telephoto lens camera according to a third illustrative embodiment of the present invention, which is similar to first embodiment, but in which the mirrors are all provided with a monolithic member.

Referring to FIG. 3 there is shown a side, cross sectional view of a compact, disc-shaped, on-axis telephoto lens camera 300 according to a third illustrative embodiment of the present invention. A physical as well as optical axis 380 of the camera 300 is the main and only axis extending in a longitudinal direction of the camera. The camera 300 is structurally and functionally similar to the camera 100 in FIG. 1 except that it includes a thin, essentially solid, monolithic member 310 with which are integrally provided a mirror arrangement including mirrors 311-314, a first lens surface 301 defining aperture 326 through which incident light rays enter the camera, and a ring 303 and shield 316 formed of light-blocking, non-reflective material, whereas in the camera 100 of the first embodiment the corresponding components are formed separately or mostly separately and then joined together with open spaces defined between some of the components, including between the first and second mirrors 111, 112. The focal point 311F of the first mirror surface 311 is offset from the main axis 380 of the camera 300 similar to how the focal point 111F is offset from the main axis 180 in camera 100, and the arrangement of mirror surfaces 311-314 in the camera 300 has essentially the same thickness in the longitudinal direction in comparison to the arrangement of mirrors 111-114 in the camera 100. Again, like parts of the camera 300 are designated by reference numbers similar to those of the camera 100 except that the numbers begin with "3" rather than "1". All details of the camera 300 will not be described, as many of the details correspond to the details of the camera 100 discussed above in relation to FIG. 1. Primarily, the differences will be described.

The thin monolithic member 310 may be formed—molded of transparent optical materials with positive refractive index such acrylic and glass, and may have various surfaces treated and/or modified for forming the lens surfaces, mirror surfaces, and light-blocking/non-reflecting surfaces therewith. On outer-object side of the monolithic lens 310, a first lens surface 301 in doughnut shape may be a planar surface without any coating or treatment applied to the outer-object side thereof, and through which incident light rays enter the camera 300. The first lens surface 301 may be an aspheric surface for aberration correction as indicated by broken line 302. On the opposite side of the monolithic lens 310 there is provided a first or primary mirror surface 311 in doughnut shape and a fourth, mid mirror surface 314 in doughnut shape, both of which may be formed by coating the corresponding surfaces of the member 310 with a totally reflective material such as aluminum. At a center portion of the outer-object side of the monolithic member 310, there are provided a second or secondary mirror surface 312 and a third mid mirror surface 313 in doughnut shape, both of which may be formed by coating the corresponding surfaces of the member 310 with a totally reflective material such as aluminum. The outer-object side of the monolithic lens 310 is also provided with a thin, non-reflective, light-blocking disc-shaped shield 316, which may be a separate member connected to the monolithic member 310 or a coating applied to the member 310. A non-reflective ring 303 disposed around a circumference of the monolithic lens 310 between the first lens 301 and the first mirror surface 311 may be coated with non-reflective material, like carbon or added on by a non-reflective ring member. At a center portion of the other or opposite side of the monolithic member 310, a cavity 384 is defined which extends inwardly from an inner diameter 385 of the first mirror surface 311 to an outer lens surface defined in the member 310, i.e., the lens surface 304, which does not have any coating or treatment provided thereon. The lens surface 304 may be aspheric. All of the mirror surfaces 311-314 provided with the monolithic member 310 are constructed for internal reflection of incident light rays thereon.

The third mid mirror surface 313 and the fourth mid mirror surface 314 are disposed to face each other. The function of the mid mirror surfaces 313 and 314 is to bridge in reflection of light rays from the first mirror surface 311 to the second mirror surface 312, similar to the third and fourth mid mirrors 113, 114 in camera 100. The mid mirror surfaces 313 and 314 may be designed for total internal refection without reflective coatings.

The first mirror surface 311, that may be coated by totally reflective material like aluminum, is also called a primary mirror that accepts incident light rays which enter the camera 300 through the aperture 326 defined by the first lens surface 301, and reflects and converges the light rays towards the second mirror surface 312 via the third and fourth mid mirror surfaces 313 and 314. The first mirror surface 311 is a concave mirror surface in doughnut shape, and is specifically depicted as a parabolic mirror surface with a focal point 311F which is offset from the main axis 380 of the camera 300, with an outside diameter which is essentially the same size as an outer diameter of the aperture 326 defined by the first lens 301, and a relatively large inner diameter 385. The size of the inner diameter 385 is about one half the size of the outer diameter of the aperture 326 and more than 1.5 times the outer diameter 386 of the second mirror surface 312 as depicted. An opening is defined at a central portion of the first mirror surface 311 at the inner diameter 385, and a cavity 384 extends from the opening at the central portion of the first mirror surface 311 to the outer lens surface 304 of the monolithic member 310. The multiple aspheric lenses 305, 306 are disposed in the cavity 384 similar to the lenses 105, 106 which are disposed in the cavity 184 of camera 100. Again, the cavity 384 extends from the opening at the central portion of the first mirror surface 311 to the outer lens surface 304 of the monolithic member 310 in a progressively reduced size, e.g., such as an isosceles trapezoidal shape, and the aspheric lenses 305-306 are disposed in the cavity 384, while aspheric lens 307 is disposed outside of but closely adjacent to the cavity 384 similar to the aspheric lens 107 of camera 100. The isosceles trapezoidal shaped cavity 384 and the relatively large inner diameter 385 corresponding to the central opening in the first reflective surface 311 are advantageous because they ensure that light rays expanded by the aspheric lenses 305-307 can be diverged progressively and widely enough to correspond to and take advantage of a large size of image sensor 395. The thickness 387' of the monolithic member 310 is a crucial dimension for the total thickness 387 of the camera 300 as a smaller thickness 387' of the monolithic member ensures a smaller total thickness 387 of the camera 300. In order for the camera 300 to fit within a modern thin mobile device such as a smart phone, the total thickness 387 of the cameras 300 should be about 4-5 mm, or less. Again, making the focal point 311F of the first mirror surface 311 offset from the camera's main axis 380 helps to minimize the thickness 387', however, the reflected light rays from the first mirror surface 311 could not directly reach the second mirror surface 312 without providing the third and fourth mid mirror surfaces 313 and 314.

The second mirror surface 312, also called secondary mirror, is a convex mirror, and is specifically depicted as a hyperbolic mirror with an outer diameter 386, and may be formed by coating a totally reflective material like aluminum on a surface of the monolithic member 310. The second mirror surface 312 reflects light rays back towards the direction where the image sensor 395 is located. It will be noted that the depicted first, second, and mid mirror surfaces 313 and 314 are not to scale and do not exactly represent the actual curvatures of the mirror surfaces, but are intended to illustrate the reflection of light rays in an easily understandable manner. In a given physical space of a camera, there may be many different combinations of mirror surfaces to achieve a given reflection and image quality. There is a little area or opening 317 defined at a center of the second mirror surface 312 that is not coated with a totally reflective material like aluminum and incident light rays cannot reach such opening/area or be reflected at such opening/area to avoid formation of ghost images similar to the opening/area 117 in camera 100 as discussed above because ghost images may reduce the quality of desired image on the image sensor 395. There are many ways to make the little center opening/area 317 of the second mirror surface 312, e.g., forming the opening or not coating the center area with non-reflective material. Just leaving the area without any reflective coating is one of easy ways.

The center of the object side of the monolithic member 310 may be provided with the thin non-reflective, light-blocking disc shield 316. Its diameter may be about the same size of the inner diameter 385 of the first mirror surface 311. The shield 316 is used to block unwanted incident light rays, from entering the outer-object side of the monolithic member 310 and to cover back sides of the second mirror surface 312 and the third mid mirror surface 313 similar to the shield 116 in camera 100. If the outer diameter of the shield is larger than the inner diameter 385 of the first mirror surface 311, it would reduce the amount of the incident light rays entering onto the first mirror surface 311. If it is smaller than the inner diameter 385 of the first mirror surface 311, it may not sufficiently perform its intended functions. The disc shield 316 may be made by a separate non-reflective material or a non-reflective coating, like carbon coating.

Aspheric lenses 305 and 306 are disposed inside the cavity 384 and the aspheric lens 307 is disposed outside the cavity 384, and each of the lenses 305-307 is formed to have one side or both sides aspheric to expand image size and possibly also adjusting image quality. As a practical matter, the camera 300 requires at least one aspheric lens for expanding image size and possibly also adjusting image quality. As with other embodiments, the more aspheric lenses that are included with the camera 300, the better the quality of image formed and captured by the camera 300, but increasing the number of aspheric lenses included with the camera also increases the cost and complexity of same. The diameters of multiple aspheric lenses progressively increase to enlarge the image size toward the image sensor. It should be noted that the depicted aspheric lenses 305-307 are not to scale and do not exactly represent the actual curvatures of the lenses, but are intended to illustrate the path of light rays in and through the camera 300 in an easily understandable manner. In a given physical space of a camera, there may be many different combinations of different lenses to achieve a given or desired image size and image quality. Because the aspheric lenses 305-307 are increasing in size beyond the opening 385 in the first reflective surface 311, this ensures that the camera 300 may effectively utilize a large image sensor 395 with an outer diameter having a size generally corresponding to the outer diameter of the aperture 326. The size of the image sensor 395 may be bigger or smaller than the inner diameter 385 of the central opening in the first mirror surface 311. In other words, the image sensor size is not limited by the thickness of a mobile phone. Because the image sensor 395 is disposed closely adjacent to the last aspheric lens 307, and a focal point-pattern of the 390 of the lens 307 is on the image sensor, the camera 300 has essentially no back focal length, which is a physical distance between the lens 307 and the image sensor 395, which contributes the reduction of the total thickness 387 of the camera 300. The aspheric lenses 305, 306, 307 may be molded by common optical materials, like acrylic and glass.

The rest of the components of the camera 300, including aspheric lens 307, image sensor 395, IR screen 397, mount 318, step motor 398, image sensor diameter 399, unwanted light rays 362, 363 which are being blocked, etc., correspond to the like components of the camera 100 in FIG. 1 in structure and function and are not discussed in detail.

A brief explanation of how lights rays enter, pass through and are captured as images by the camera 300, based on the simplified ray diagram in FIG. 3, is as follows in which only representative light rays are depicted and discussed. When parallel incident light rays 320 and 321 shine on the outer-object surface of the first lens surface 301 within the aperture 326, incident light ray 320 passes through the first lens surface 301 and becomes light ray 330. It is then reflected by the first or primary mirror surface 311 to become light ray 340 and is directed to the second mirror surface 312 via the third and fourth mid mirror surfaces 313 and 314. It then is reflected to become light ray 350 which exits the monolithic member 310 through the outer lens surface 304 towards the aspheric lens 305 and is then sequentially refracted by the multiple aspheric lenses 305, 306, and 307 such that it is expanded and possibly corrected. It exits lens 307 to become light ray 360 and then passes through the optional IR screen 397 towards a focal point-pattern 390 of the lens 307 which corresponds with the location of the image sensor 395. Similarly, light ray 321 becomes 331, then 351, and finally 361.

In FIG. 3 incident light rays 320' and 321' enter the camera 300 through the first lens surface 301 at an angle of approximately 2.5° to horizontal as depicted at reference number 388. When the light ray 320' shines on the outer-object surface of the first lens surface 301 within the aperture 326, the incident light ray 320' passing through the first lens surface 301 becomes light ray 330'. It is then reflected by the first mirror surface 311 to become light ray 340' and is directed to the second mirror surface 312 via the third and fourth mid mirror surfaces 313, 314. It then is reflected to become light ray 350' which exits the monolithic member 310 through the outer lens surface 304 towards the aspheric lens 305 and is then sequentially refracted to be expanded and possibly corrected by the multiple aspheric lenses 305, 306, and 307. It exits lens 307 to become light ray 360' and then goes through the IR screen 397 towards a focal point 391 of the lens 307, which also corresponds to where the image sensor 395 is located. As shown in FIG. 3, the light ray 320' which enters the first lens surface 301 at an angle of approximately 2.5° to horizontal is expanded by the aspheric lenses 305-307 such that the focal point 391 where the ray 360' hits the image sensor 395 is at a location which is at an angle of approximately 45° to the central axis 380 of the camera as indicated at 389. Similarly, the incident light ray 321' becomes 331', then 351', and finally 361'.

The telephoto lens camera 300 according to the third embodiment achieves all of the same advantages as the camera 100 according to the first embodiment, again, noting that the primary difference between the cameras 100, 300 is that the camera 300 includes the monolithic member 310 on which are provided the lens surfaces 301, 304, the mirror surfaces 311-314, the ring 303 and the shield 316, whereas in the camera 100 the components are formed separately and joined together.

Figure 4:
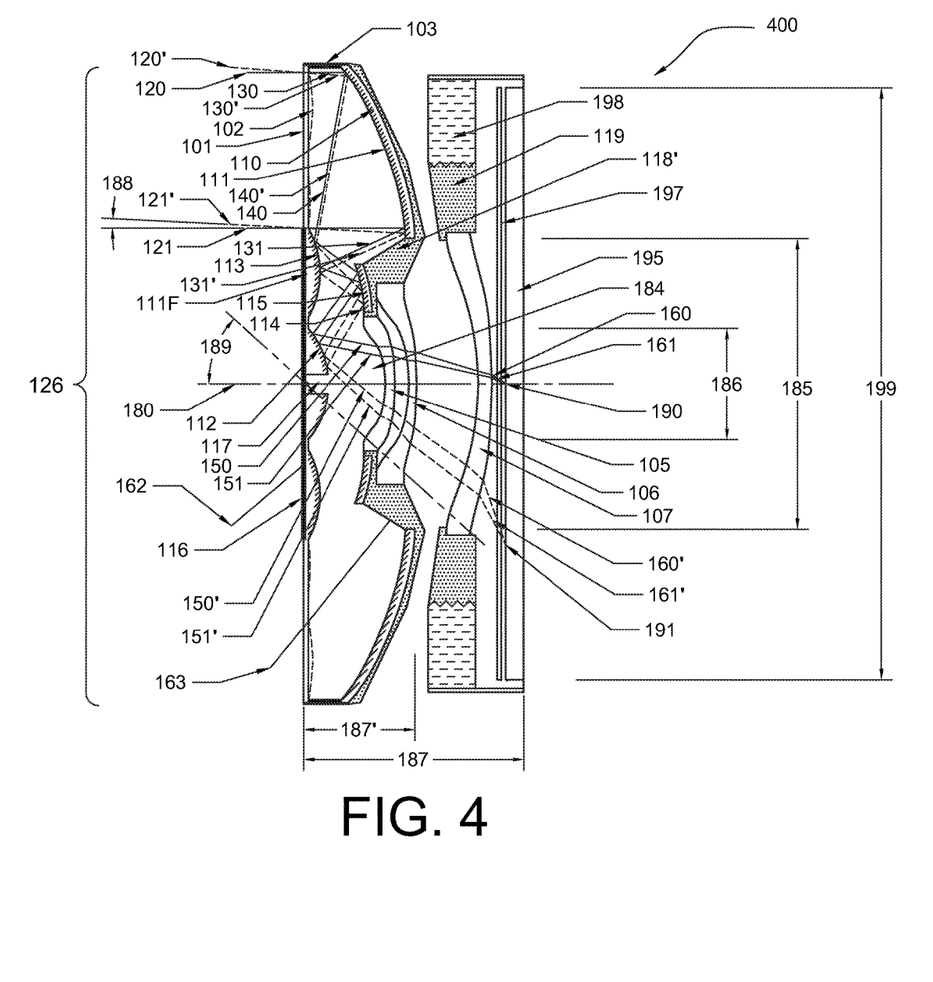
FIG. 4 is a side, cross sectional view of a modification of the camera according to the first embodiment shown in FIG. 1, in which some components are mounted separately from other components.

Referring to FIG. 4 there is shown a side, cross sectional view of a compact, disc-shaped, on-axis telephoto lens camera 400 which is a modification of the camera 100 according to the first illustrative embodiment of the present invention. The camera 400 is structurally and functionally identical to the camera 100 in FIG. 1 except that the camera 400 includes two mounts 118', 119 which are separate components that may be separately secured or moved relative to each other whereas the camera 100 includes the single mount 118. All part numberings for identical components in the cameras 100, 400 are the same. In other words, the mount 118 of the camera 100 in FIG. 1 becomes a first mount 118' and a second mount 119 of the camera 400 in FIG. 4. The first mount 118' holds all mirrors and lenses together except the lens 107, the second mount 119 holds the lens 107, and the mounts 118', 119 may be separately secured within a mobile device such as a smart phone. In this modification, the step motor 198 moves only the lens 107 relative to the image sensor 195 to finely adjust image sharpness for the camera 400, whereas in camera 100 the step motor 198 moves all the mirrors and lenses relative to the image sensor 195. The camera 400 in FIG. 4 illustrates that it is possible to move one or some of the camera's components relative to the image sensor 195 to adjust the image sharpness, and it will be understood that that other variations are possible besides the two arrangements of cameras 100, 400. The camera 400 functions the same as and achieves all of the same advantages as the camera 100, while the provision of the two mounts 118', 119 gives an additional element of flexibility for disposing the camera 400 within a mobile device such as a smart phone.

Figure 5:
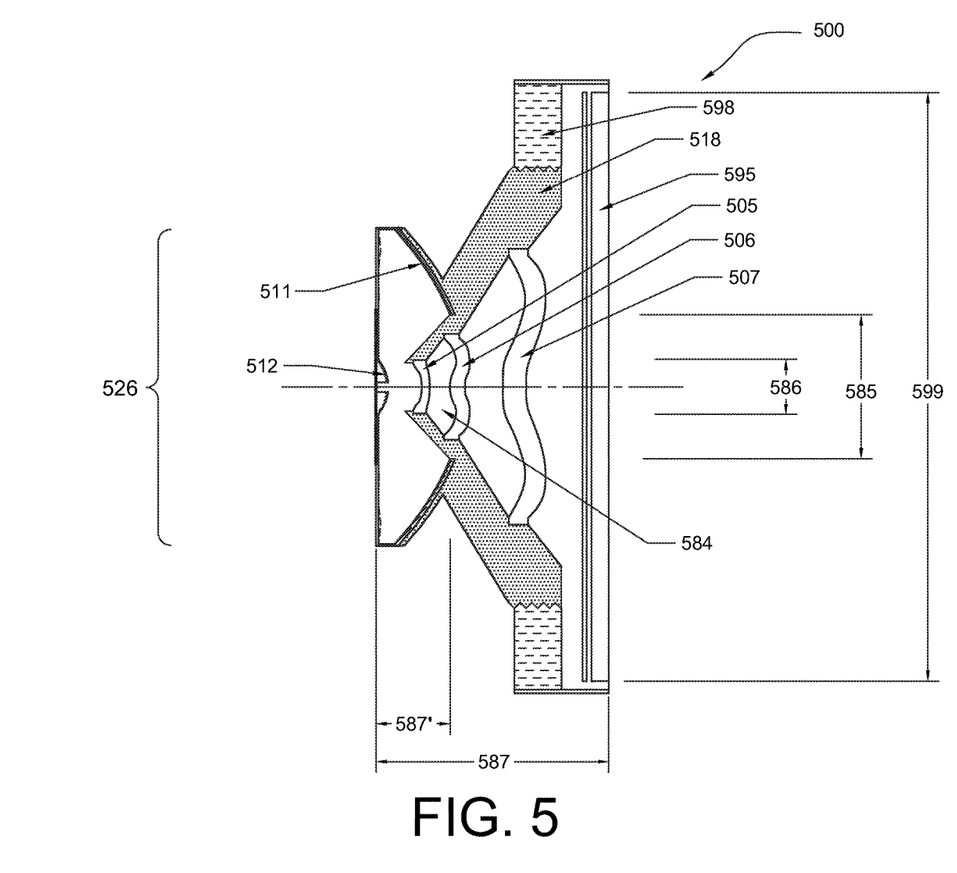
FIG. 5 is a side, cross sectional view of a compact, on-axis telephoto lens camera according to a fourth illustrative embodiment of the present invention in which an aperture for incident light is smaller than an image sensor.
Figure 6:
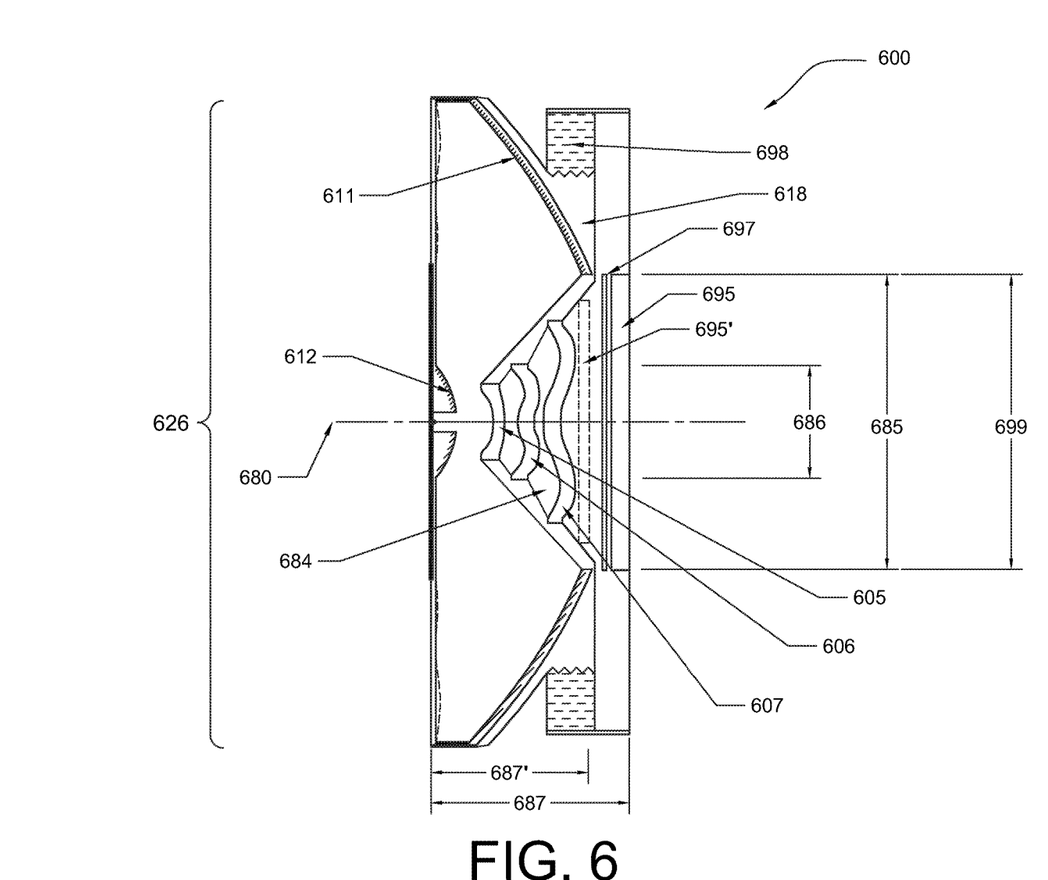
FIG. 6 is a side, cross sectional view of a compact, on-axis telephoto lens camera according to a fifth illustrative embodiment of the present invention in which an aperture for incident light is larger than an image sensor.

FIGS. 5, 6 depict side, cross sectional views of two other exemplary embodiments of a compact, disc-shaped, on-axis telephoto lens camera according to the present invention, which are modifications of the camera 200 according to the second illustrative embodiment of the present invention. The only differences between the camera 200 according to the second embodiment of the present invention and the cameras 500, 600 are: 1) the relative sizes of the outer diameter of the first or primary mirror 511, 611, which is essentially the same size as the outer diameter of the aperture 526, 626 of the first lens of the cameras 500, 600, and the outer diameter of the image sensor 595, 695 as compared to the relative sizes of the corresponding components in the camera 200; 2) in the camera 500 the aspheric lenses 505, 506, 507 are spaced further apart from each other as compared to the lenses 205-207 in the camera 200 so that the lenses may sufficiently expand the light rays toward the image sensor 595 having the relatively larger size, with the lens 506 extending from within the cavity 584 to outside of the cavity, rather than being fully disposed within the cavity such as the lens 206 is fully within cavity 284; and 3) in the camera 600 all of the aspheric lenses 605-607, and possibly the image sensor, are disposed fully within the cavity 684, which is appropriate given the relatively smaller size of the outer diameter 699 of the image sensor 695, as compared to the camera 200 in which the lens 207 is disposed outside of the cavity 284. In the camera 200 of the second embodiment the outer diameter 299 of the image sensor 295 is slightly smaller than the outer diameter of the first or primary mirror 211, while in the camera 500 in FIG. 5 the outer diameter 599 of the image sensor 595 is much larger than the outer diameter of the first or primary mirror 511, and in the camera 600 in FIG. 6 the outer diameter 699 of the image sensor 595 is much smaller than the outer diameter of the first or primary mirror 611. In FIG. 6, the image sensor 695 is depicted in solid lines fully outside of the cavity 684, but an alternative position of the image sensor 695' fully within the cavity 684 is also indicated with broken lines. As another possibility, which is not shown, the image sensor could be disposed partly inside and partly outside the cavity. Otherwise, the cameras 500, 600 are structurally and functionally identical to the camera 200 of the second embodiment. Many of the references numbers for the various components and for the light rays entering, passing through and being captured as images by the cameras 500, 600 are omitted in FIGS. 5, 6, because the corresponding components are the same as in the camera 200 shown in FIG. 2.

Referring to FIG. 5 there is shown a side, cross sectional view of the compact, disc-shaped, on-axis telephoto lens camera 500 which, again, is a modification of the camera 200 according to the second illustrative embodiment of the present invention. FIG. 5 shows the thin cylindrical camera 500 in cross sectional and symmetrical view relative to a main and only longitudinal axis 580 of the camera. FIG. 5 shows relationship of mirrors and lenses when the camera 500 has a much smaller size for the outer diameter of the aperture 526 in comparison to the size of the outer diameter 599 of the image sensor 595. The inner diameter 585 of the opening at the central portion of the primary mirror 511 is more than twice as large as the outer diameter 586 of a secondary mirror 512 of the camera 500, corresponding to the relative sizes of the corresponding components in the camera 200. A mount 518 holds all mirrors and lenses to be driven by a step motor 598 to finely adjust image sharpness relative to the image sensor 595. One advantage of camera 500 in comparison to the camera 200 is that the smaller thickness 587' of mirror arrangement in camera 500 as compared to the thickness 287' of the mirror arrangement in the camera 200 leaves more room for use of more aspheric lenses to expand image size of light rays passing from the secondary mirror 512 toward the image sensor 595, while still being able to fit the camera 500 within a mobile device or smart phone having a given longitudinal thickness. One disadvantage of camera 500 in comparison to the camera 200 is that the smaller size of the outer diameter of the aperture 526 in camera 500 as compared to the outer diameter of the aperture 226 in camera 200 results in the captured images having less brightness than the images captured by the camera 200. However, the camera 500 meets requirement of a thin, on-axis telephoto lens camera, which may be conveniently disposed within a mobile such as a smart phone, e.g., in FIG. 5 the outer diameter 599 of the image sensor 595 is larger than the total thickness 587 of the camera 500.

Referring to FIG. 6 there is shown a side, cross sectional view of the compact, disc-shaped, on-axis telephoto lens camera 600 which, again, is a modification of the camera 200 according to the second illustrative embodiment of the present invention. FIG. 6 shows the thin cylindrical camera 600 in cross sectional and symmetrical view relative to a main and only longitudinal axis 680 of the camera. FIG. 6 shows relationship of mirrors and lenses when the camera 600 has a much larger size for the outer diameter of the aperture 626 in comparison to the size of the outer diameter 699 of the image sensor 695. The inner diameter 685 of the opening at the central portion of the primary mirror 611 is more than twice as large as the outer diameter 686 of a secondary mirror 612 of the camera 600, corresponding to the relative sizes of the corresponding components in the camera 200. A mount 618 holds all mirrors and lenses to be driven by a step motor 698 to finely adjust image sharpness relative to the image sensor 695. One advantage of camera 600 in comparison to the camera 200 is that the much larger size of the outer diameter of the aperture 626 in camera 600 as compared to the outer diameter of the image sensor 695 results in the images captured by the camera 600 having greater brightness than the images captured by the camera 200 in which the outer diameters of the aperture 226 and the image sensor 295 are approximately the same. One disadvantage of camera 600 in comparison to the camera 200 is that the larger longitudinal thickness 687' of the mirror arrangement constrains all of the aspheric lenses 605-607 to be disposed within the cavity 684, and possibly the image sensor 695' as well according to the alternative arrangement discussed above, which may limit the size of images captured by the camera 600. However, the camera 600 meets requirement of a thin, on-axis telephoto lens camera which may be conveniently disposed within a mobile device such as a smart phone, e.g., in FIG. 6 the outer diameter 699 of the image sensor 695 is larger than the total thickness 687 of the camera 600. Even in this modification of FIG. 6 the outer diameter of the image sensor 695 or 695' is larger than the outer diameter of the secondary mirror 612, consistent with all of the other exemplary embodiments depicted in the drawings.

Although the exemplary embodiments described above have been discussed as having certain components and arrangement, persons of ordinary skill in the art will understand that various modification and additions may be made thereto within the scope of the present invention as defined in the claims appended hereto. For example, there have been discussed herein some possible changes and optional features that may be used with some of the exemplary embodiments. It will be understood that such possible changes and optional features that may be used with others of the exemplary embodiments as long as they are not incompatible therewith. For example, the multiple mount arrangement, including two separate mounts 118', 119 in the exemplary embodiment of FIG. 4 could also be utilized in the cameras according to the exemplary embodiments of FIGS. 2, 3, 5, 6, and relative sizes of the mirror arrangements and image sensors in the cameras according to the exemplary embodiments of FIGS. 1, 3, 4 could be modified similarly to the arrangements of these components in FIGS. 5-6. As yet another example, all of the aspheric lenses and the image sensor may be disposed at least partly within the cavity.

I claim:

1. A compact, on-axis telephoto lens camera comprising:
    an on-axis multiple-mirror arrangement which receives incident light entering the camera, and compresses and redirects the received incident light, the multiple-mirror arrangement including a primary mirror which receives the incident light entering the camera, compresses and redirects the received incident light toward a focal point of the primary mirror and has an opening defined at a central portion thereof, and a secondary mirror which receives light that has been compressed and redirected by the primary mirror and further redirects the light;
    a cavity which extends from the opening at the central portion of the primary mirror towards the secondary mirror in a progressively reduced size;
    a plurality of aspheric lenses disposed at least partially within the cavity which receive the compressed and redirected light from the multiple-mirror arrangement, and expand and redirect the light received from the multiple-mirror arrangement; and
    an image sensor which receives the expanded and redirected light from the aspheric lenses,
    wherein the image sensor is disposed closely adjacent to the cavity such that a back focal length is substantially zero, and
    wherein a diameter of the opening in the central portion of the primary mirror is at least 1.5 times as large as an outer diameter of the secondary mirror.

2. The compact, on-axis telephoto lens camera according to claim 1, wherein a focal point of the primary mirror is offset from a central longitudinal axis of the camera, and the on-axis multiple-mirror arrangement additionally includes at least one mid-mirror disposed between the primary and secondary mirrors which directs light from the primary mirror to the secondary mirror.

3. The compact, on-axis telephoto lens camera according to claim 1, wherein the plurality of aspheric lenses have different sizes and are arranged relative to each other according to progressively increasing size such that a largest one of the aspheric lenses is disposed closest to the image sensor.

4. The compact, on-axis telephoto camera lens according to claim 1, further comprising an adjustment mechanism which adjusts size of a distance between the image sensor and at least one of the aspheric lenses.

5. The compact, on-axis telephoto lens camera according to claim 1, further comprising a monolithic member formed of a optical material having a positive refractive index and the multiple mirror arrangement is formed on the monolithic member.

6. The compact, on-axis telephoto lens camera according to claim 1, wherein at least one of an outer diameter of an aperture through which the incident light enters the camera and an outer diameter of the image sensor is larger than a longitudinal length of the camera.

7. The compact, on-axis telephoto lens camera according to claim 1, further comprising: another lens defining an aperture through which the incident light enters the camera; and a disc-shaped, light-blocking shield disposed to cover a central portion of the other lens, wherein an outer diameter of the shield is substantially the same as a diameter of the opening at the central portion of the primary mirror.

8. The compact, on-axis telephoto lens camera according to claim 7, wherein the secondary mirror is disposed to project inward of the camera at a center portion of the other lens, and the shield covers a back surface of secondary mirror.

9. The compact, on-axis telephoto lens camera according to claim 1, wherein a central portion of the secondary mirror is non-reflective such that it does not redirect the light received by the secondary mirror.

10. The compact, on-axis telephoto lens camera according to claim 1, wherein a total length of the camera in a longitudinal direction thereof is in a range of 2 mm to 8 mm.

11. The compact, on-axis telephoto camera lens according to claim 1, wherein a magnification power of the camera is in a range of 3×-12×.

12. The compact, on-axis telephoto lens camera according to claim 1, further comprising another lens defining an aperture through which the incident light enters the camera, an area which extends between an outer periphery of the primary mirror and an outer periphery of the other lens includes a light blocking material so that incident light can enter the camera only through the aperture.

13. The compact, on-axis telephoto lens camera according to claim 1, wherein all of the aspheric lenses are disposed within the cavity.

14. The compact, on-axis telephoto lens camera according to claim 13, wherein the image sensor is disposed at least partly within the cavity.

15. The compact, on-axis telephoto lens camera according to claim 1, wherein at least one of the aspheric lenses has aspheric curvatures on opposite sides thereof.

16. The compact, on-axis telephoto lens camera according to claim 1, wherein the primary mirror is parabolic in shape and the secondary mirror is hyperbolic in shape.

17. The compact, on-axis telephoto lens camera according to claim 1, wherein each of the mirrors of the mirror arrangement and each of the aspheric lenses is a molded member.

18. The A compact, on-axis telephoto lens camera comprising:
an on-axis multiple-mirror arrangement which receives incident light entering the camera, and compresses and redirects the received incident light, the multiple-mirror arrangement including a primary mirror which receives the incident light entering the camera, compresses and redirects the received incident light toward a focal point of the primary mirror and has an opening defined at a central portion thereof, and a secondary mirror which receives light that has been compressed and redirected by the primary mirror and further redirects the light;
a cavity which extends from the opening at the central portion of the primary mirror towards the secondary mirror in a progressively reduced size;
a plurality of aspheric lenses disposed at least partially within the cavity which receive the compressed and redirected light from the multiple-mirror arrangement, and expand and redirect the light received from the multiple-mirror arrangement;
a mount which supports the mirror arrangement and at least some of the aspheric lenses, wherein boundaries of the cavity are defined by at least one surface of the mount; and
an image sensor which receives the expanded and redirected light from the aspheric lenses,
wherein the image sensor is disposed closely adjacent to the cavity such that a back focal length is substantially zero.

19. The compact, on-axis telephoto lens camera according to claim 18, wherein the mount blocks light from entering the cavity other than through one of the aspheric lenses disposed closest to the secondary mirror.

20. A compact, on-axis telephoto lens camera comprising:
an on-axis multiple-mirror arrangement which receives incident light entering the camera, and compresses and redirects the received incident light, the multiple-mirror arrangement including a primary mirror which receives the incident light entering the camera, compresses and redirects the received incident light toward a focal point of the primary mirror and has an opening defined at a central portion thereof, and a secondary mirror which receives light that has been compressed and redirected by the primary mirror and further redirects the light;
a cavity which extends from the opening at the central portion of the primary mirror towards the secondary mirror in a progressively reduced size;
a plurality of aspheric lenses disposed at least partially within the cavity which receive the compressed and redirected light from the multiple-mirror arrangement, and expand and redirect the light received from the multiple-mirror arrangement; and
an image sensor which receives the expanded and redirected light from the aspheric lenses,
wherein the image sensor is disposed closely adjacent to the cavity such that a back focal length is substantially zero, and
wherein an outer diameter of the image sensor is larger than an outer diameter of the secondary mirror.

* * * * *